United States Patent
Matsushita et al.

(10) Patent No.: US 6,809,458 B2
(45) Date of Patent: Oct. 26, 2004

(54) APPARATUS AND METHOD FOR CONTROLLING ULTRASONIC MOTOR

(75) Inventors: Yukihiro Matsushita, Hamakita (JP); Motoyasu Yano, Kosai (JP); Masahiro Takeda, Toyohashi (JP)

(73) Assignee: ASMO Co., Ltd., Shizuoka-ken (JP)

( * ) Notice: Subject to any disclaimer, the term of this patent is extended or adjusted under 35 U.S.C. 154(b) by 178 days.

(21) Appl. No.: 10/313,206

(22) Filed: Dec. 6, 2002

(65) Prior Publication Data

US 2003/0107298 A1 Jun. 12, 2003

(30) Foreign Application Priority Data

Dec. 6, 2001 (JP) ........................................ 2001-373130

(51) Int. Cl.[7] .............................................. H01L 41/08
(52) U.S. Cl. ................................................ 310/316.01
(58) Field of Search ....................... 310/316.01, 316.02, 310/317, 319, 323.02; 318/116–118

(56) References Cited

U.S. PATENT DOCUMENTS 5,136,215 A * 8/1992 Izukawa .................... 318/116
5,159,223 A * 10/1992 Suganuma ............. 310/316.02
5,539,268 A * 7/1996 Kataoka ................. 310/316.02
5,612,598 A * 3/1997 Fukui et al. ................. 318/116
5,616,979 A * 4/1997 Nishikawa ............. 310/316.02

FOREIGN PATENT DOCUMENTS

| JP | 09-321573 | 11/1997 |
| JP | 10-355879 | 12/1998 |

* cited by examiner

Primary Examiner—Mark Budd
(74) Attorney, Agent, or Firm—Sheridan Ross PC

(57) ABSTRACT

A control apparatus controls an ultrasonic motor. The ultrasonic motor includes a stator, a piezoelectric element provided in the stator, and a rotor. The rotor is slidably pressed against the stator. When a driving high frequency voltage is applied to the piezoelectric element, the stator is vibrated to rotate the rotor. The control apparatus includes measuring means. The measuring means changes the frequency of a searching high frequency voltage, the searching high frequency voltage being lower than the driving high frequency voltage, thereby measuring a resonance frequency of the ultrasonic motor. The control apparatus drives the motor in a favorable manner.

25 Claims, 10 Drawing Sheets

US 6,809,458 B2

APPARATUS AND METHOD FOR CONTROLLING ULTRASONIC MOTOR

BACKGROUND OF THE INVENTION

The present invention relates to an apparatus and a method for controlling an ultrasonic motor.

Conventional ultrasonic motors include standing wave type. A bolted Langevin type is one of the standing wave type ultrasonic motors. A bolted Langevin type ultrasonic motor has a stator and a rotor. The stator has metal blocks and piezoelectric elements. The metal blocks are fastened by bolts to hold the piezoelectric elements in between. The rotor is pressed against the stator. Slits are formed in the circumference of the metal blocks. When axial vibrations are generated, the slits generate torsions.

When a high frequency voltage that has a resonance frequency f1 (f2) of the stator shown in FIG. 10, which is referred to as Hfd voltage, is applied to electrodes pressed against the piezoelectric elements, the stator (the surface contacting the rotor) is vibrated. The vibration rotates the rotor in one direction (in the other direction).

Specifically, when the Hfd voltage of the resonance frequency f1 is applied, a compound vibration of torsional vibration and axial vibration is generated on the stator (the surface contacting the rotor). The compound vibration rotates the rotor in one direction. The floating force of the axial vibration component of the stator and propulsion force of the torsional vibration component rotate the rotor in one direction.

When the Hfd voltage of the resonance frequency f2 is applied, a compound vibration of torsional vibration and axial vibration is generated on the stator (the surface contacting the rotor). The compound vibration rotates the rotor in one direction. The resonance frequency of the rotor is set to match the resonance frequency f2. The axial vibration of the rotor generates torsional vibration at the rotor, which vibration rotates the rotor in a direction opposite to that of the case when the Hfd voltage of the resonance frequency f1 is applied. The floating force of the axial vibration component of the stator and propulsion force of the torsional vibration component rotate the rotor in a direction opposite to that of the case when the Hfd voltage of the resonance frequency f1 is applied.

A control apparatus for controlling such an ultrasonic motor is configures to operate at these two resonance frequencies f1, f2. When an operator manipulates a switch for rotating the rotor in a forward direction, the control apparatus applies the HFd voltage of the resonance frequency f1 to the electrode plates (piezoelectric elements). When the operator manipulates a switch for rotating the rotor in a reverse direction, the control apparatus applies the Hfd voltage of the resonance frequency f2 to the electrode plates (piezoelectric elements).

However, when manufacturing such ultrasonic motors, it is difficult to maintain the resonance frequencies f1, f2 constant for each motor. Also, changes in the environment (environmental changes caused by elapsed time and performed treatments) shift the resonance frequencies f1, f2. Therefore, the predetermined operational frequencies f1, f2 of the above control apparatus can be deviated from the actual resonance frequencies f1, f2 of the ultrasonic motor (stator). This degrades the operation of the motor. Particularly, if the two resonance frequencies f1, f2 are close, the deviation of the operational frequencies of the control apparatus relative to the actual resonance frequencies f1, f2 may cause the rotor to be rotated in a direction opposite to the direction the operator intends.

SUMMARY OF THE INVENTION

Accordingly, it is an objective of the present invention to provide an apparatus and a method for controlling an ultrasonic motor, which drive the motor in a favorable manner.

To achieve the foregoing and other objectives and in accordance with the purpose of the present invention, a control apparatus controls an ultrasonic motor is provided. The ultrasonic motor includes a stator, a piezoelectric element provided in the stator, and a rotor. The rotor is slidably pressed against the stator. When a driving high frequency voltage is applied to the piezoelectric element, the stator is vibrated to rotate the rotor. The control apparatus includes measuring means. The measuring means changes the frequency of a searching high frequency voltage, the searching high frequency voltage being lower than the driving high frequency voltage, thereby measuring a resonance frequency of the ultrasonic motor.

The present invention also provides a method for controlling an ultrasonic motor. The ultrasonic motor includes a stator, a piezoelectric element provided in the stator, and a rotor. The rotor is slidably pressed against the stator. The method comprising: a first step, in which, to measure a resonance frequency of the ultrasonic motor, the frequency of a searching high frequency voltage is changed, the searching high frequency voltage being lower than the driving high frequency voltage of the ultrasonic motor; and a second step, in which the stator is vibrated to rotate the rotor when the driving high frequency voltage is applied to the piezoelectric element.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

Figure 1:
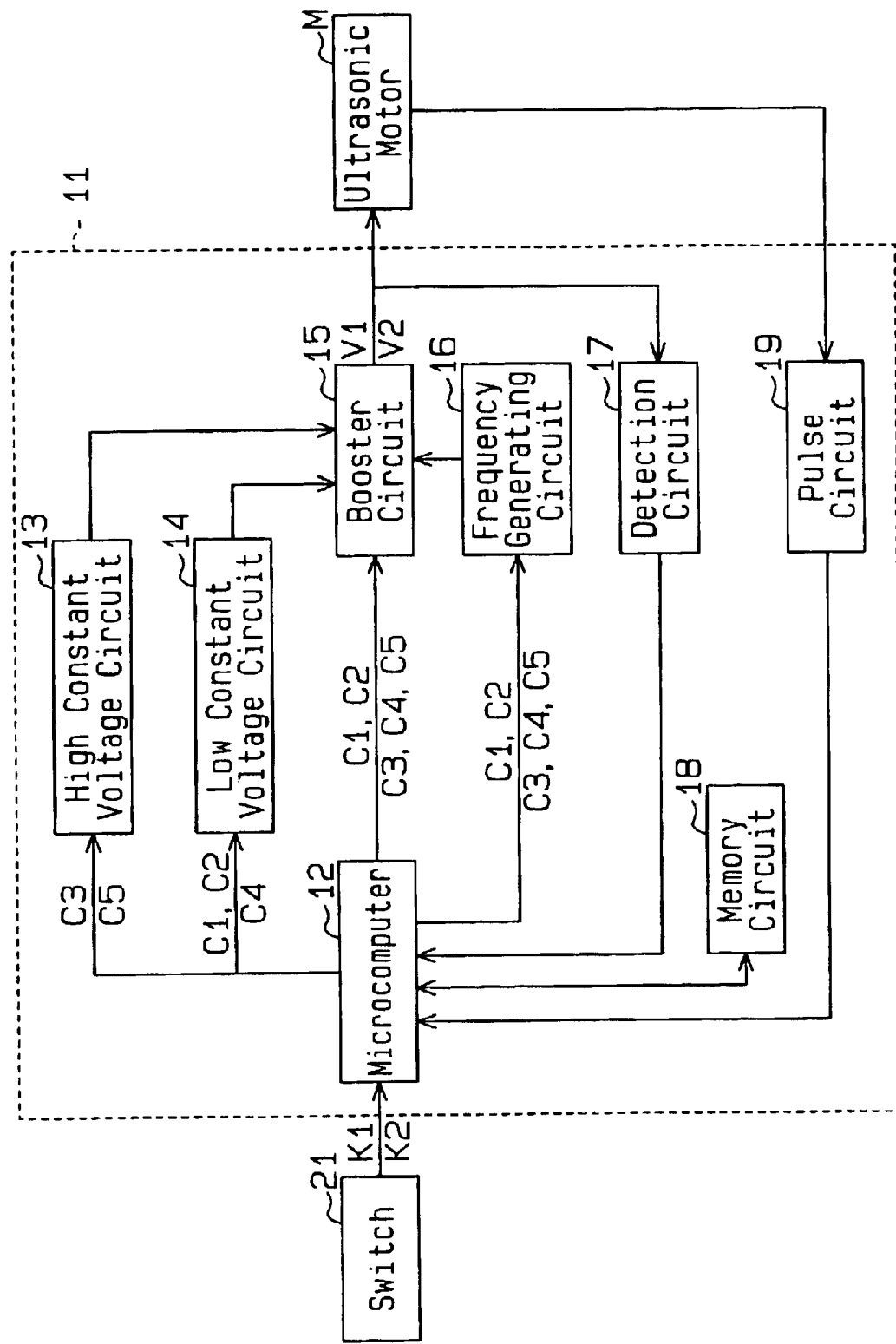
FIG. 1 is a block diagram showing a control apparatus according to one embodiment of the present invention.

A control apparatus according to a first embodiment of the present embodiment will flow be described with reference to FIGS. 1 to 5. The control apparatus controls an on-vehicle actuator having an ultrasonic motor M. As shown in FIG. 2, the ultrasonic motor M includes a stator 1 and a rotor 2. The stator 1 includes a first block 3, a second block 4, first and second piezoelectric elements 5, 6, first and second electrode plates 7, 8, a bolt 9, and an insulating collar 10.

The first and second blocks 3, 4 are made of conductive metal, which is aluminum alloy in this embodiment. The first block 3 is substantially cylindrical. The inner diameter of the upper portion of the first block 3 is enlarged to form a horn portion 3a. The horn portion 3a amplifies vibrations generated at the upper end of the first block 3. A female thread 3b is formed in the inner surface of the first block 3 except for the horn portion 3a. A thin friction member 3c is attached to the top end of the first block 3.

The second block 4 is substantially cylindrical and its inner and outer diameters are set equal to those of the first block 3. Slits 4a are formed in the upper outer circumference of the second block 4. The slits 4a function as vibration converter that generates torsional vibration based on generated axial vibration. The slits 4a are inclined relative to the rotation axis.

Fixing projections 4b are formed on the axially middle part of the circumference of the second block 4. The fixing projections 4b are used for fixing the motor M to an unillustrated external member (for example, a motor housing).

A female thread 4c is formed in the inner circumference of the second block 4 (the female thread 4c is shown by broken lines in FIG. 2).

The first and second piezoelectric elements 5, 6 are shaped like disks and each have a through hole at the center. The inner diameter of the first and second piezoelectric elements 5, 6 is greater than the inner diameter of the first and second blocks 3, 4.

The first and second electrode plates 7, 8 are shaped like disks and each have a through hole at the center. The inner diameter of the first and second electrode plates 7, 8 is equal to that of the first and second piezoelectric elements 5, 6.

A bolt 9 is substantially cylindrical and has a male thread 9a on the circumference. The bolt 9 is threaded with the female threads 3b, 4c.

A cylindrical insulating collar 10 is made of an insulating resin. The outer diameter of the insulating collar 10 is substantially equal to the outer diameter of the first and second piezoelectric elements 5, 6 and the inner diameter of the first and second electrode plates 7, 8. The inner diameter of the insulating collar 10 is equal to the outer diameter of the male thread 9a of the bolt 9 to receive the bolt 9.

The first and second piezoelectric elements 5, 6, the first and second electrode plates 7, 8, and the first and second blocks 3, 4 are fastened to one another by the bolt 9 extending therethrough so that the blocks 3, 4 hold the piezoelectric elements 5, 6 and the electrode plates 7, 8 in between. Specifically, the second block 4, the second electrode plate 8, the second piezoelectric element 6, the first electrode plate 7, the first piezoelectric element 5, the first block 3 are stacked in this order. The bolt 9 (the male thread 9a) extends through the stacked members and is threaded with the female threads 3b, 4c of the first and second blocks 3, 4. The polarization direction of the first piezoelectric element 5 is opposite to that of the second element 6. The insulating collar 10 is located between the male thread 9a of the bolt 9 and the surfaces of the first and second piezoelectric elements 5, 6 and the first and second electrode plates 7, 8. Therefore, the circumference of the bolt 9 is electrically insulated form the inner surfaces of the first and second piezoelectric elements 5, 6 and the first and second electrode plates 7, 8 The second electrode plate 8 is electrically connected with the first block 3 through the second block 4 and the bolt 9.

The rotor 2 is substantially cylindrical and has an outer diameter that is equal to the outer diameters of the first and second blocks 3, 4. A pressing mechanism (not shown) presses the rotor 2 against the upper surface of the stator 1, or the upper end surface of the first block 3 (the friction member 3c). Slits 2a (recesses) are formed in the outer circumference of the rotor 2. When axial vibration is generated, the slits 2a generates torsional vibration. The slits 2a are inclined relative to the rotation axis.

Figure 4:
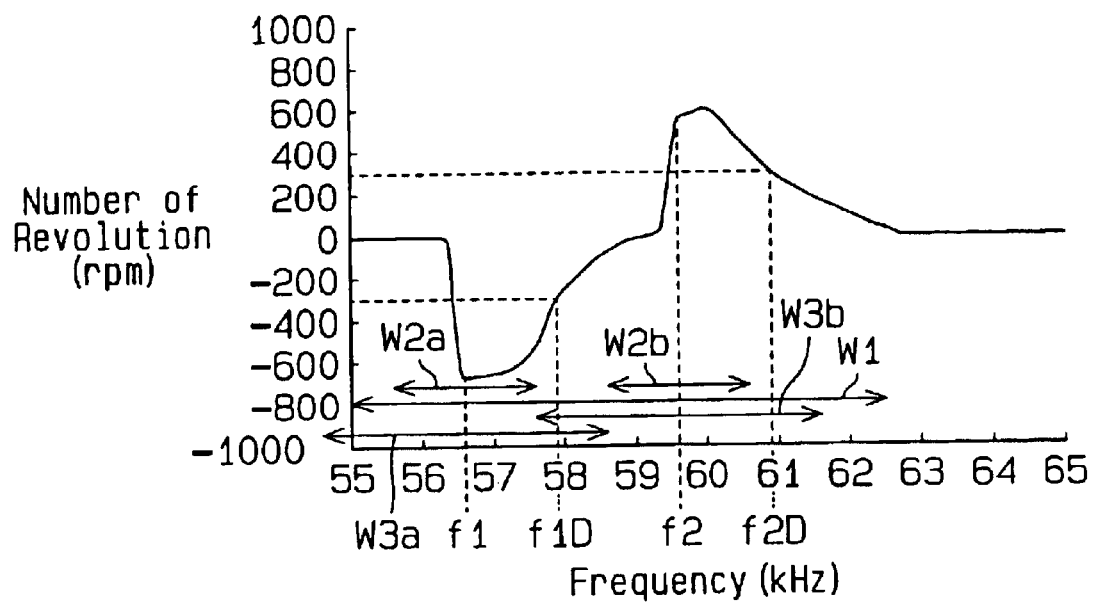
FIG. 4 is a graph showing the relationship between the frequency and the number of revolution of the ultrasonic motor shown in FIG. 2.

When a driving high frequency voltage V1 having a first resonance frequency f1 (approximately 56.6 kHz) is supplied to the first and second electrode plates 7, 8 an shown in FIG. 4, the first and second piezoelectric elements 5, 6 generate axial vibration. Based on the axial vibration, the slits 4a of the stator 1 generate torsional vibration. At this time, the vibration at the upper end of the stator 1, that is, the vibration at the upper end of the first block 3 (the frictional member 3c), is compound vibration containing the torsional vibration rotating the rotor 2 in a reverse (the minus direction in FIG. 4) and the axial vibration. The floating force of the axial vibration component of the stator 1 and the propulsive force of the torsional vibration component of the stator 1 cause the rotor 2 rotate in the reverse direction at a rotation speed of 700 rpm. This operation is referred to as a stator main mode. When a driving high frequency voltage V1 having a frequency close to the first resonance frequency f1, or a frequency in the range between approximately 56.3 kHz and approximately 59.0 kHz), is supplied to the first and second electrode plates 7, 8 as shown in FIG. 4, the rotor 2 rotates in the reverse direction at a speed corresponding to the frequency.

On the other hand, when a driving high frequency voltage V1 having a second resonance frequency f2 (approximately 59.6 kHz) is supplied to the first and second electrode plates 7, 8 as shown in FIG. 4, the first and second piezoelectric elements 5, 6 generate axial vibration. Based on the axial vibration, the slits 4a of the stator 1 generate torsional vibration. At this time, the vibration at the upper end of the stator 1, that is, the vibration at the upper end of the first block 3 (the frictional member 3c), is compound vibration containing the small torsional vibration rotating the rotor 2 in the forward direction (the plus direction in FIG. 4) and the axial vibration. The resonance frequency of the rotor 2 is set to match the second resonance frequency f2. At the rotor 2, torsional vibration that rotates the rotor 2 in the forward direction is generated based on the axial vibration of the stator 1. Therefore, the floating force of the axial vibration component of the stator 1 and the propulsive force of the torsional vibration components of the stator 1 and the rotor 2 cause the rotor 2 to rotate in the forward direction at a rotation speed of 600 rpm. This operation is referred to as a rotor main mode. When a driving high frequency voltage V1 having a frequency close to the second resonance frequency f2, or a frequency in the range between approximately 59.3 kHz and approximately 62.7 kHz, is supplied to the first and second electrode plates 7, 8 as shown in FIG. 4, the rotor 2 rotates in the forward direction at a speed corresponding to the frequency.

Figure 2:
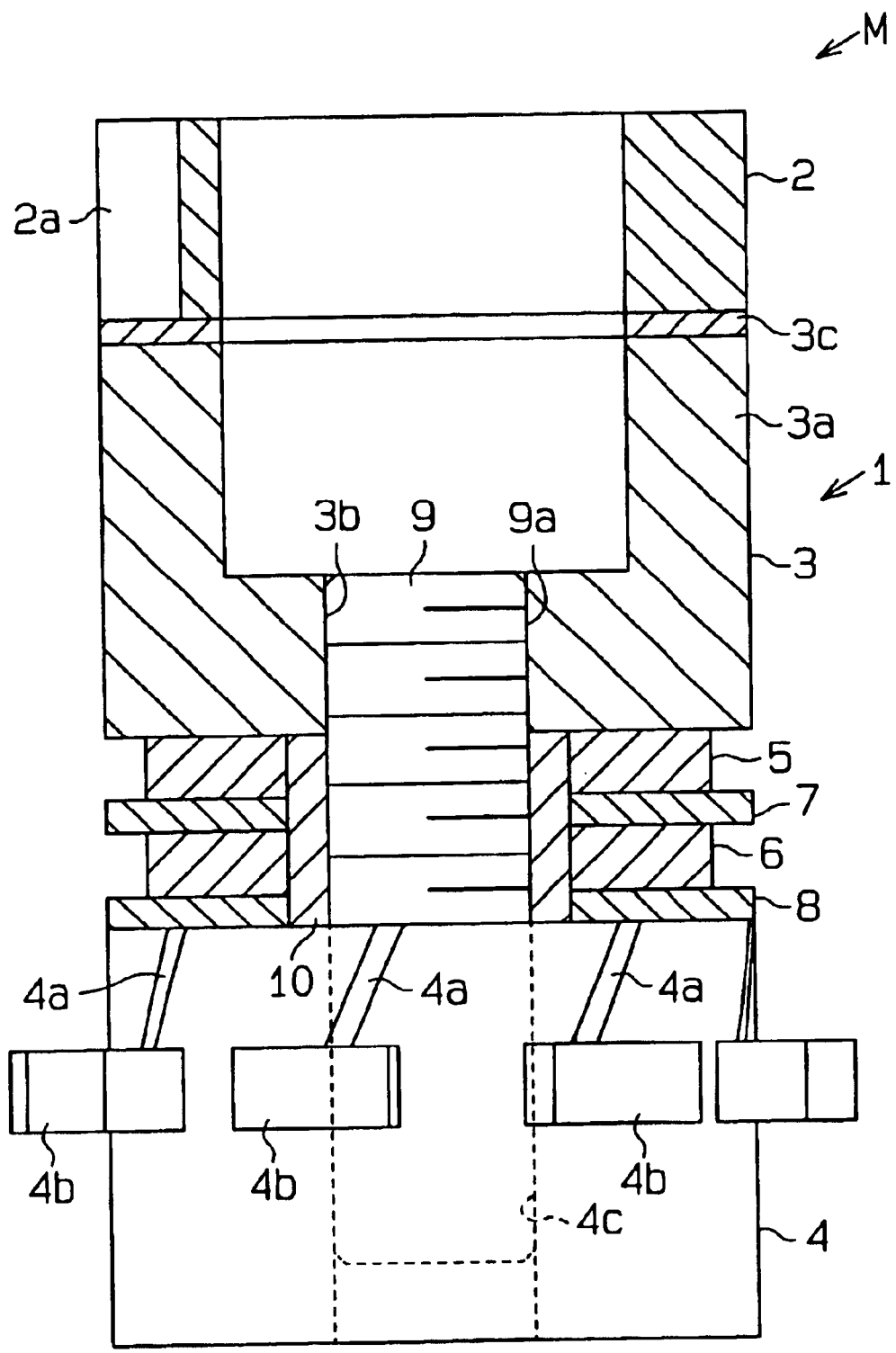
FIG. 2 is a partial cross-sectional view illustrating the ultrasonic motor of the embodiment of FIG. 1.

As shown in FIG. 1, the control apparatus 11 of the on-vehicle actuator having the ultrasonic motor M includes a microcomputer 12, a high constant voltage circuit 13, a low constant voltage 14, a booster circuit 15, a frequency generating circuit 16, a detection circuit 17, a memory circuit 18, and a pulse circuit 19. Power is supplied to the control apparatus 11 when the vehicle ignition key is turned on. The power to the control apparatus 11 is stopped when the ignition key is turned off. The low constant voltage circuit 14 and the booster circuit 15 form a searching constant voltage generating circuit. The microcomputer 12, the low constant voltage circuit 14, the booster circuit 15, the frequency generating circuit 16, the detection circuit 17, and the memory circuit 18 form resonance frequency measuring means.

Figure 3:
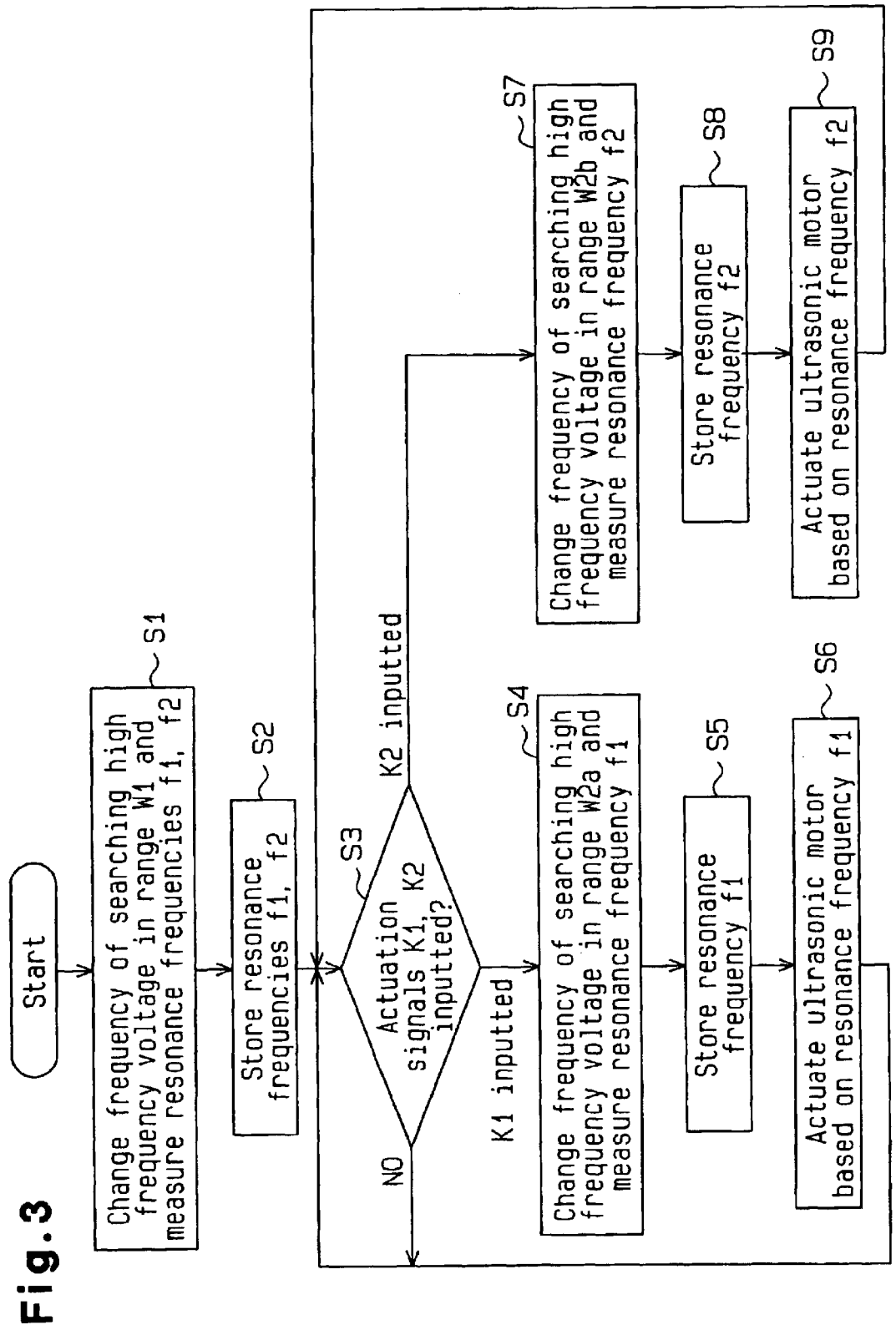
FIG. 3 is a flowchart showing a process executed by the controller of FIG. 2.

When receiving power or when a switch 21 is manipulated, the control apparatus 11 executes steps S1 to S9 shown in FIG. 3.

When receiving power, the microcomputer 12 outputs a control signal C1 to the low constant voltage circuit 14, the booster circuit 15, and the frequency generating circuit 16 in step S1. Based on the control signal C1, the low constant voltage circuit 14 outputs a constant voltage to the booster circuit 15. Based on the control signal C1 and the constant voltage from the low constant voltage circuit 14, the booster circuit 15 generates a searching voltage (SC voltage). On the other hand, the frequency generating circuit 16 sets the SC voltage as a searching high frequency voltage (SHf voltage) V2 based on the control signal C1. The frequency generating circuit 16 also changes the frequency of the SHf voltage V2 in a first range W1 (see FIG. 4) and supplies SHf voltage V2 to the ultrasonic motor M. The SHf voltage V2 is set lower than a driving high frequency voltage (Hfd voltage) V1 used for rotating the rotor 2 of the ultrasonic motor M. The SHf voltage V2 is sufficiently low not to rotate the rotor 2. The first range W1 is sufficiently wide to include the first and second resonance frequencies f1, f2 of the ultrasonic motor M. In this embodiment, the range W1 is between 55.0 kHz and 62.5 kHz as shown in FIG. 4. The frequency generating circuit 16 gradually changes, or sweeps, the frequency of the SHf voltage V2 from 55.0 kHz to 62.5 kHz.

Figure 5:
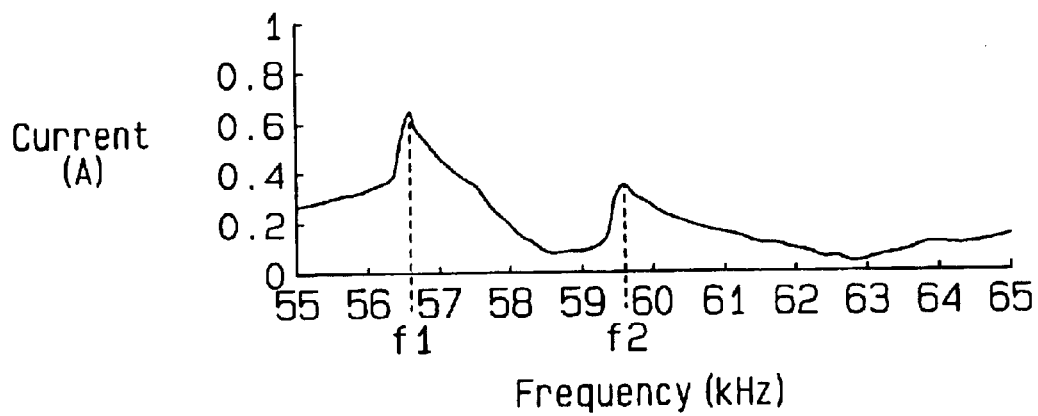
FIG. 5 is a graph showing the relationship between the frequency and the current of the ultrasonic motor shown in FIG. 2.

The detection circuit 17 detects the current value supplied to the piezoelectric elements 5, 6 that changes when the frequency of the SHf voltage V2 is changed (see FIG. 5). The detected current value functions as a varying resonance value. The detection circuit 17 outputs the detection result to the microcomputer 12. Therefore, as shown in FIG. 5, the current value supplied to the microcomputer 12 is changed when the SHf voltage V2 is changed. Based on the supplied current value, the microcomputer 12 measures the first and second resonance frequencies f1, f2. The current value supplied to the piezoelectric elements 5, 6 has extrema (turning points at which the current value switches from increasing to decreasing) when resonance occurs. Thus, as shown in FIG. 5, the extrema are detected as the first and second resonance frequencies f1, f2 (approximately 56.6 kHz, approximately 59.6 kHz). Based on the detection of the first and second resonance frequencies f1, f2, the measurement is terminated regardless of the predetermined range W1 (even if the frequency is being changed toward 62.5 kHz). In this embodiment, when the first and second resonance frequencies f1, f2 are detected, the measurement of the resonance frequencies f1, f2 is terminated.

In step S2, the microcomputer 12 stores the measured first and second resonance frequencies f1, f2 in the memory circuit 18.

In step S3, the microcomputer 12 judges whether it has received actuation signals K1, K2, which are generated based on manipulation of the switch 21. The actuation signal K1 is used for rotating the rotor 2 in the reverse direction (in the minus direction as viewed in FIG. 4) by a predetermined amount. The actuation signal K2 is used for rotating the rotor 2 in the forward direction (in the plus direction as viewed in FIG. 4) by a predetermined amount.

If the microcomputer 12 judges that it has not received the actuation signals K1, K2, the microcomputer 12 repeats step S3, or enters a standby state.

If the microcomputer 12 judges that it has received the actuation signal K1, the microcomputer 12 proceeds to step S4.

In step S4, the microcomputer 12 outputs the control signal C2 to the low constant voltage circuit 14, the booster circuit 15, and the frequency generating circuit 16. Based on the control signal C2, the low constant voltage circuit 14 outputs a constant voltage to the booster circuit 15. Based on the control signal C2 and the constant voltage from the low constant voltage circuit 14, the booster circuit 15 generates a SC voltage that corresponds to the SHf voltage V2. On the other hand, the frequency generating circuit 16 converts the SC voltage into a SHf voltage V2 based on the control signal C2. The frequency generating circuit 16 also changes the frequency of the SHf voltage V2 in a range W2a (see FIG. 4) and supplies SHf voltage V2 to the ultrasonic motor M. The range W2a is a relatively narrow range that is set based on the first resonance frequency f1 measured in the previous procedure. In this embodiment, the range W2a is a range of 1 kHz (from approximately 55.6 kHz to approximately 57.6 kHz) including the first resonance frequency f1 stored in the memory circuit 18. The frequency generating circuit 16 gradually changes, or sweeps, the frequency of the SHf voltage V2 from 55.6 kHz to 57.6 kHz.

As in step S1, the detection circuit 17 detects the current value (see FIG. 5) of the ultrasonic motor M and outputs the detection result to the microcomputer 12. Therefore, as shown in FIG. 5, the current value supplied to the microcomputer 12 is changed when the SHf voltage V2 is changed. Based on the supplied current value, the microcomputer 12 measures the first resonance frequency f1. The current value supplied to the piezoelectric elements 5, 6 has an extremum (turning point at which the current value switches from increasing to decreasing) when resonance occurs. Thus, as shown in FIG. 5, the extremum is detected as the first resonance frequency f1 (approximately 56.6 kHz). Based on the detection of the first resonance frequency f1, the measurement is terminated regardless of the predetermined range W2a (even if the frequency is being changed toward 57.6 kHz). In this embodiment, the first resonance frequency f1 is assumed not to have been raised or lowered, or shifted, from the completion of step S1 to step S4.

In step S5, the microcomputer 12 stores the measured first resonance frequency f1 in the memory circuit 18.

In step S6, the microcomputer 12 outputs a control signal C3 to the high constant voltage circuit 13, the booster circuit 15, and the frequency generating circuit 16. Based on the control signal C3, the high constant voltage circuit 13 outputs a high constant voltage that is higher than the constant voltage output from the low constant voltage circuit 14 to the booster circuit 15. Based on the control signal C3 and the constant voltage from the high constant voltage circuit 13, the booster circuit 15 generates a driving constant voltage that corresponds to the Hfd voltage V1. Based on the control signal C3 and the first resonance frequency f1, which is stored in the memory circuit 18, the frequency generating circuit 16 sets the driving constant voltage as the Hfd voltage V1 and supplies the Hfd voltage V1 to the ultrasonic motor M, thereby driving the motor M.

When starting the ultrasonic motor M, the frequency generating circuit 16 supplies the Hfd voltage V1, the frequency of which is higher than the measured first resonance frequency f1 by a predetermine amount (for example, by 1.5 kHz), to the ultrasonic motor M, and shifts the frequency toward the first resonance frequency f1. Specifically, in this embodiment, the frequency generating circuit 16 supplies the Hfd voltage V1 that is higher than the first resonance frequency f1 (approximately 56.6 kHz) by 1.5 kHz. That is, the frequency generating circuit 16 supplies the Hfd voltage V1 of approximately 58.1 kHz, and then shifts the frequency toward the approximately 56.6 kHz, thereby starting the ultrasonic motor M. Therefore, from the beginning to the end of the starting procedure, the rotation speed is gradually increased (increased in the minus direction). Compared to a case in which the Hfd voltage V1 of the first resonance frequency f1 (approximately 56.6 kHz) is supplied from the beginning of the starting procedure, the ultrasonic motor M is started mildly.

The pulse circuit 19 is a hall IC that detects passage of a sensor magnet (not shown) attached to the rotor 2 and outputs pulse signals that correspond to the rotation speed (number of rotation) of the rotor 2 to the microcomputer 12. When determining that the rotor 2 has been rotated in the reverse direction (the minus direction as viewed in FIG. 4) based on the pulse signals, the microcomputer 12 stops driving the ultrasonic motor M and proceeds to step S3.

If the microcomputer 12 judges that it has received the actuation signal K2 based on manipulation of the switch 21 in step S3, the microcomputer 12 proceeds to step S7.

In step S7, the microcomputer 12 outputs a control signal C4 to the low constant voltage circuit 14, the booster circuit 15, and the frequency generating circuit 16. Based on the control signal C4, the low constant voltage circuit 14 outputs a constant voltage to the booster circuit 15. Based on the control signal C4 and the constant voltage from the low constant voltage circuit 14, the booster circuit 15 generates the SC voltage that corresponds to the SHf voltage V2. On the other hand, the frequency generating circuit 16 sets the SC voltage as the SHf voltage V2 based on the control signal C4. The frequency generating circuit 16 also changes the frequency of the SHf voltage V2 in a range W2b (see FIG. 9) and supplies SHf voltage V2 to the ultrasonic motor M. The range W2b is a relatively narrow range that is set based on the second resonance frequency f2 measured in the previous procedure. In this embodiment, the range W2b is a range of 1 kHz (from approximately 58.6 kHz to approximately 60.6 kHz) including the second resonance frequency f2 stored in the memory circuit 18. The frequency generating circuit 16 gradually changes, or sweeps, the frequency of the SHf voltage V2 from 58.6 kHz to 60.6 kHz.

As in step S1, the detection circuit 17 detects the current value (see FIG. 5) of the ultrasonic motor M and outputs the detection result to the microcomputer 12. Therefore, as shown in FIG. 5, the current value supplied to the microcomputer 12 is changed when the SHf voltage V2 is changed. Based on the supplied current value, the microcomputer 12 measures the second resonance frequencies f2. The current value supplied to the piezoelectric elements 5, 6 has an extremum (turning point at which the current value switches from increasing to decreasing) when resonance occurs. Thus, as shown in FIG. 5, the extremum is detected as the second resonance frequency f2 (approximately 59.6 kHz). Based on the detection of the second resonance frequency f2, the measurement is terminated regardless of the predetermined range W2b (even if the frequency is being changed toward 60.6 kHz). In this embodiment, the second resonance frequency f2 is assumed not to have been raised or lowered, or shifted, from the completion of step S1 to step S7.

In step S8, the microcomputer 12 stores the measured second resonance frequency f2 in the memory circuit 18.

In step S9, the microcomputer 12 outputs a control signal C5 to the high constant voltage circuit 13, the booster circuit 15, and the frequency generating circuit 16. Based on the control signal C5, the high constant voltage circuit 13 outputs a high constant voltage that is higher than the constant voltage output from the low constant voltage circuit 14 to the booster circuit 15. Based on the control signal C5 and the constant voltage from the high constant voltage circuit 13, the booster circuit 15 generates a driving constant voltage that corresponds to the Hfd voltage V1. Based on the control signal C5 and the second resonance frequency f2, which is stored in the memory circuit 18, the frequency generating circuit 16 sets the driving constant voltage as the Hfd voltage V1 and supplies the Hfd voltage V1 to the ultrasonic motor M, thereby driving the motor M.

When starting the ultrasonic motor M, the frequency generating circuit 16 supplies the Hfd voltage V1, the frequency of which is higher than the measured second resonance frequency f2 by a predetermine amount (for example, by 1.5 kHz), to the ultrasonic motor M, and shifts the frequency toward the second resonance frequency f2. Specifically, in this embodiment, the frequency generating circuit 16 supplies the Hfd voltage V1 that is higher than the second resonance frequency f2 (approximately 59.6 kHz) by 1.5 kHz. That is, the frequency generating circuit 16 supplies the Hfd voltage V1 of approximately 61.1 kHz, and then shifts the frequency toward the approximately 59.6 kHz, thereby starting the ultrasonic motor M. Therefore, from the beginning to the end of the starting procedure, the rotation speed is gradually increased (increased in the plus direction). Compared to a case in which the Hfd voltage V1 of the second resonance frequency f2 (approximately 59.6 kHz) is supplied from the beginning of the starting procedure, the ultrasonic motor M is started mildly.

The pulse circuit 19 is a hall IC that detects passage of a sensor magnet (not shown) attached to the rotor 2 and outputs pulse signals that correspond to the rotation speed (number of rotation) of the rotor 2 to the microcomputer 12. When determining that the rotor 2 has been rotated in the forward direction (the plus direction as viewed in FIG. 4) based on the pulse signals, the microcomputer 12 stops driving the ultrasonic motor M and proceeds to step S3.

The above embodiment has the following advantages.

(1) The first and second resonance frequencies f1, f2 of the ultrasonic motor M are measured at the specifying high frequency voltage V2, which is set lower than the Hfd voltage V1 for rotating the ultrasonic motor M (the rotor 2).

Therefore, by controlling the Hfd voltage V1 based on the first and second resonance frequencies f1, f2, which are measured before starting the motor M, the motor M is actuated in a favorable manner.

(2) When the first (second) resonance frequency f1 (f2) is measured for the second time or later, the range W2a (W2b), within which the SHf voltage V2 is changed, is set as a narrow range based on the first (second) resonance frequency f1 (f2) that is measured in the previous procedure. Specifically, as compared to the range W1, which is a 7.5 kHz range between 55.0 kHz and 62.5 kHz, the ranges W2a, W2b each are a 2 kHz range. Therefore, the time required for measuring is shortened.

(3) In step S1, based on the detection of the first and second resonance frequencies f1, f2, the measurement is terminated regardless of the predetermined range W1 (even if the frequency is being changed toward 62.5 kHz). In step S4, based on the detection of the first resonance frequency f1, the measurement is terminated regardless of the predetermined range W2a (even if the frequency is being changed toward 57.6 kHz). In step S7, based on the detection of the second resonance frequency f2, the measurement is terminated regardless of the predetermined range W2b (even if the frequency is being changed toward 60.6 kHz). Accordingly, the time required for measurement in each of steps S1, S4, S7 is shortened.

(4) when the power is turned on based on manipulation of the ignition key, the first and second resonance frequencies f1, f2 are measured for the first time in advance regardless whether the ultrasonic motor M is started, and the control apparatus 11 enters the standby state. When the actuation signal K1 (K2) is inputted based on manipulation of the switch 21, the first (second) resonance frequency f1 (f2) at starting is measured. Based on the measured first (second) resonance frequency f1 (f2), the motor M is started. When the first (second) resonance frequency f1 (f2) is measured for the second time or later, time for measuring is short. Therefore, if the actuation signals K1, K2 are outputted based on manipulation of the switch 21 after the first and second resonance frequencies f1, f2 are measured for the first time, time from when the switch 21 is manipulated to when the measurement is completed is shortened (particularly, in a case where time from when the power is turned on to the manipulation of the switch 21 is long). Therefore, time required from when the switch 21 is turned on to when the ultrasonic motor M is started is shortened.

(5) Resonance variable value, which varies when the frequency of the SHf voltage V2 is changed, is a current value (see FIG. 5). Based on this current value, the first and second resonance frequencies f1, f2 are obtained. Therefore, the first and second resonance frequencies f1, f2 are easily measured.

(6) When starting the ultrasonic motor M, the frequency generating circuit 16 supplies the Hfd voltage V1, the frequency of which is higher than the measured first (second) resonance frequency f1 (f2) by a predetermine amount (for example, by 1.5 kHz), and shifts the frequency toward the first (second) resonance frequency f1 (f2). Therefore, from the beginning to the end of the starting procedure, the rotation speed is gradually increased. Compared to a case in which the Hfd voltage V1 of the first (second) resonance frequency f1 (f2) is supplied from the beginning of the starting procedure, the ultrasonic motor M is started mildly.

(7) The frequency generating circuit 16, which changes the SHf voltage V2, also functions as a circuit for shifting the frequency of the Hfd voltage V1. Therefore, the control apparatus 11 is simplified and thus reduces the cost.

(8) The ultrasonic motor M has different rotation properties, or rotates in different directions, when actuated at different resonance frequencies, or at the first and second resonance frequencies f1, f2. The driving high frequency voltage V1 is controlled based on the first and second resonance frequencies f1, f2, which are measured prior to starting of the motor M. Therefore, the motor M is not rotated in a direction opposite to the direction corresponding to manipulation of the switch 21. The motor M is thus reliably operated.

It should be apparent to those skilled in the art that the present invention may be embodied in many other specific forms without departing from the spirit or scope of the invention. Particularly, it should be understood that the invention may be embodied in the following forms.

Figure 6A:
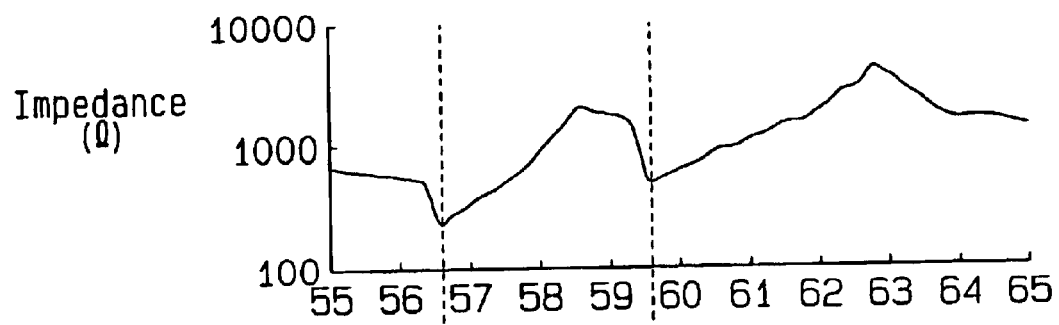
FIG. 6(a) is a graph showing the relationship between the frequency and the impedance of the ultrasonic motor shown in FIG. 2.
Figure 6B:
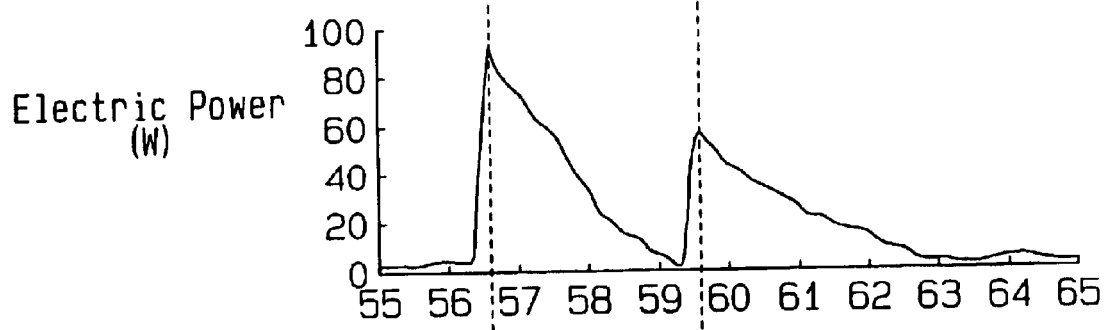
FIG. 6(b) is a graph showing the relationship between the frequency and the electric power of the ultrasonic motor shown in FIG. 2.
Figure 6C:
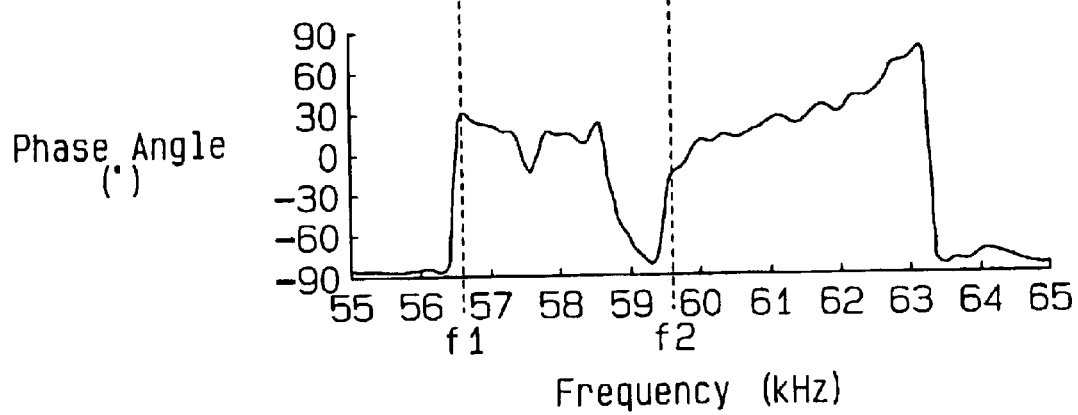
FIG. 6(c) is a graph showing the relationship between the frequency and the phase angle of the ultrasonic motor shown in FIG. 2.

In the above embodiment, the detection circuit 17 detects the current value supplied to the first and second piezoelectric elements 5, 6 (see FIG. 5) as the resonance variable value that changes when the frequency of the SHf voltage V2 is changed. However, the detection circuit 17 may detect other resonance variable value that change when the SHf voltage V2 is changed. For example, as shown in FIGS. 6(a) to 6(c), the detection circuit 17 may detect the impedance of the piezoelectric elements 5, 6, the electric power supplied to the piezoelectric elements 5, 6, or the phase difference (the phase angle) between a voltage supplied to the piezoelectric elements 5, 6 and a current supplied to the piezoelectric elements 5, 6. Alternatively, the detection circuit 17 may detect a voltage value generated by the first and second piezoelectric elements 5, 6 when the piezoelectric elements 5, 6 move. Further, the detection circuit 17 may detect two or more of the current value, the impedance, the electric power, the phase angle, and the feedback voltage. The control apparatus 11 may have two or more detection circuit for detecting two or more different properties. In these cases, references by which the microcomputer 12 determines the first and second resonance frequencies f1, f2 based on the resonance variable value need be changed as necessary. This modification has the same advantages as the above embodiment.

In the above embodiment, when the actuation signal K1 (K2) based on manipulation of the switch 21 is inputted, the SHf voltage V2 is always changed in the range W2a (W2b) to measure the first (second) resonance frequency f1 (f2). However, when measuring the first (second) resonance frequency f1 (f2) for the second time or later (first measurement is the measurement of step S1), the range within which the SHf voltage V2 is changed may correspond to the time elapsed since the previous measurement or to processes executed since the previous measurement. When the first (second) resonance frequency f1 (f2) is measured for the second time or later (first measurement is the measurement of step S1), the frequency of the SHf voltage may be changed in accordance with the time elapsed since the previous measurement or with processes executed since the previous measurement. This permits the first (second) resonance frequency f1 (f2) to be measured in a range that corresponds to changing probability. Therefore, the first (second) resonance frequency f1 (f2) is reliably measured while reducing the measurement range, or shortening the measurement time.

Figure 7:
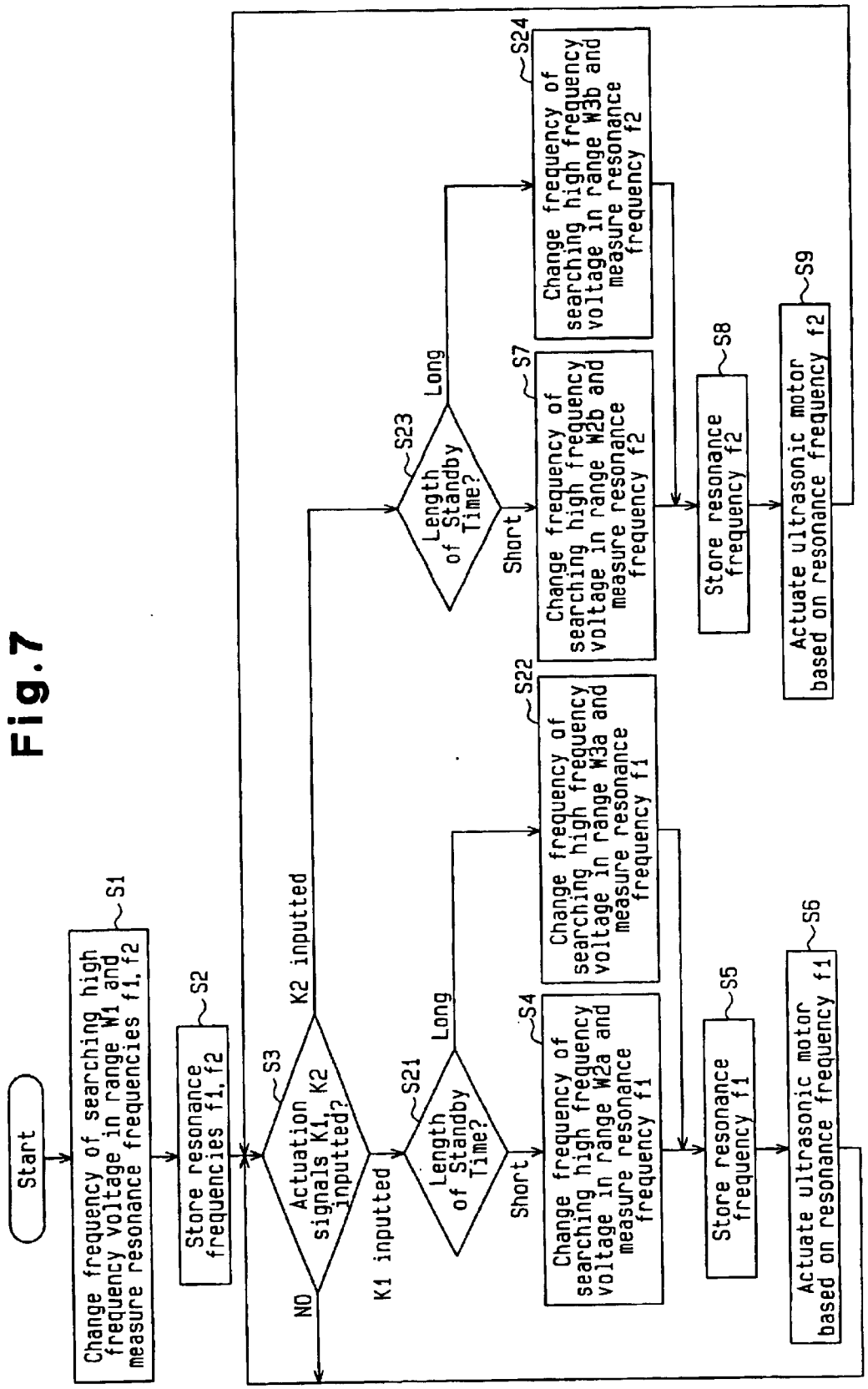
FIG. 7 is a flowchart showing a process executed by a controller according to another embodiment.

For example, the illustrated embodiment may be modified as shown in FIG. 7. The process of FIG. 7 is the same as the process shown in FIG. 3. Therefore, like or the same reference numerals are given to those steps that are like or the same as the corresponding steps in FIG. 3.

If the microcomputer 12 judges that it has received the actuation signal K1 based on manipulation of the switch 21 in step 3, the microcomputer 12 proceeds to step S21.

In step S21, the microcomputer 12 judges whether the time elapsed since the previous measurement, or the standby time, is shorter (small) or longer (great) than a reference time.

When determining that the elapsed time is shorter (small) than the reference time, the microcomputer 12 proceeds to step S4.

When determining that the elapsed time is longer (great) than the reference time, the microcomputer 12 proceeds to step S22. In step S22, the microcomputer 12 executes the same process as step S4 except for that a range W3a is used instead of the range W2a. Thereafter, the microcomputer 12 proceeds to step S5. The range W3a is narrower than the range W1 and wider than the range W2a. The range W3a is set based on the first resonance frequency f1 measured in the previous procedure. In this embodiment, as shown in FIG. 4, the range W3a is a range of 2 kHz (from approximately 54.6 kHz to approximately 58.6 kHz) including the first resonance frequency f1 stored in the memory circuit 18.

If the microcomputer 12 judges that it has received the actuation signal K2 based on manipulation of the switch 21 in step 3, the microcomputer 12 proceeds to step S23.

In step S23, the microcomputer 12 judges whether the time elapsed since the previous measurement, or the standby time, is shorter (small) or longer (great) than the reference time.

When determining that the elapsed time is shorter (small) than the reference time in step S23, the microcomputer 12 proceeds to step S7.

When determining that the elapsed time is longer (great) than the reference time in step S23, the microcomputer 12 proceeds to step S24. In step S24, the microcomputer 12 executes the same process as step S7 except for that a range W3b is used instead of the range W2b. Thereafter, the microcomputer 12 proceeds to step S8. The range W3b is narrower than the range W1 and wider than the range W2b. The range W3b is set based on the second resonance frequency f2 measured in the previous procedure. In this embodiment, as shown in FIG. 4, the range W3b is a range of 2 kHz (from approximately 57.6 kHz to approximately 61.6 kHz) including the second resonance frequency f2 stored in the memory circuit 18.

That is, if the time elapsed from the previous measurement is less than the reference time, the range within which the SHf voltage V2 is changed is set to the narrow range W2a (W2b). If the elapsed time is longer than the reference time, the range is set to the range W3a (W3b), which is narrower than the range W1 and wider than the range W2a (W2b). Therefore, the first (second) resonance frequency f1, f2 is measured according to the probability of displacement of the frequency f1, f2 while reducing the measurement range. That is, the first and second resonance frequencies f1, f2 are reliably measured while shortening the measurement time (the average measurement time).

Figure 8:
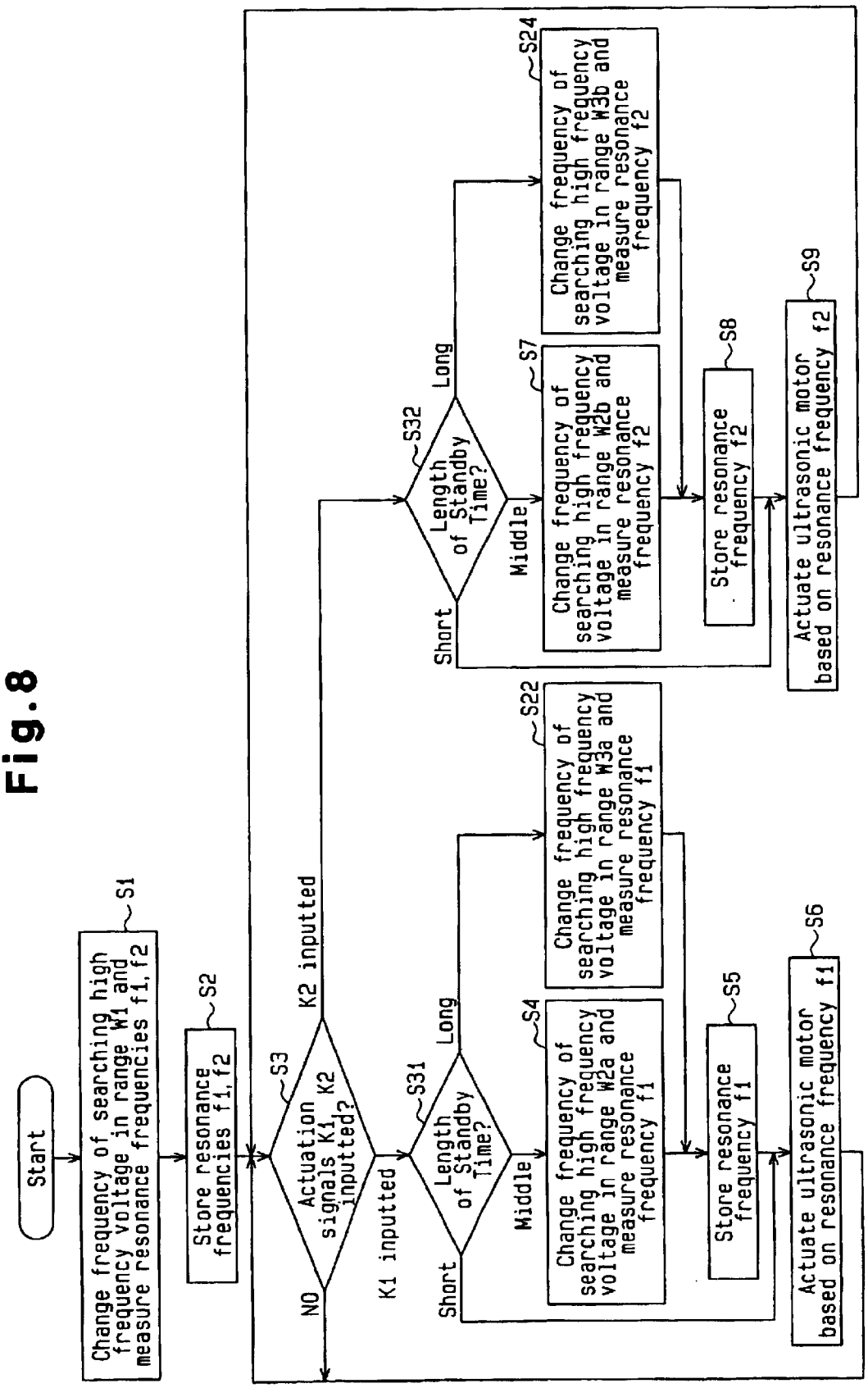
FIG. 8 is a flowchart showing a process executed by a controller according to another embodiment.

The illustrated embodiment may be modified as shown in FIG. 8. The process of FIG. 8 is similar to the process shown in FIG. 3 and the process shown in FIG. 7. Therefore, like or the same reference numerals are given to those steps that are like or the same as the corresponding steps in FIGS. 3 and 7.

If the microcomputer 12 judges that it has received the actuation signal K1 based on manipulation of the switch 21 in step 3, the microcomputer 12 proceeds to step S31.

In step S31, the microcomputer 12 judges whether the time elapsed from the previous measurement, or the standby time, is shorter (small) than a predetermined first reference time. The microcomputer 12 also judges whether the elapsed time is shorter (middle) than a predetermined second reference time and whether the elapsed time is longer (great) than the second reference time.

When determining that the elapsed time is shorter (small) than the first reference time in step S31, the microcomputer 12 proceeds to step S6.

When determining that the elapsed time is shorter (middle) than the second reference time, which is longer than the first reference time, in step S31, the microcomputer 12 proceeds to step S4.

When determining that the elapsed time is longer (great) than the second reference time in step S31, the microcomputer 12 proceeds to step 22 and then to step S5.

If the microcomputer 12 judges that it has received the actuation signal K2 in step S3, the microcomputer 12 proceeds to step S32.

In step S32, the microcomputer 12 judges whether the time elapsed from the previous measurement, or the standby time, is shorter (small) than the first reference time. The microcomputer 12 also judges whether the elapsed time is shorter (middle) than the second reference time and whether the elapsed time is longer (great) than the second reference time.

When determining that the elapsed time is shorter (small) than the first reference time in step S32, the microcomputer 12 proceeds to step S9.

When determining that the elapsed time is shorter (middle) than the second reference time, which is longer than the first reference time, in step S32, the microcomputer 12 proceeds to step S7.

When determining that the elapsed time is longer (great) than the second reference time in step S32, the microcomputer 12 proceeds to step S24 and then to step S8.

That is, if the time elapsed from the previous measurement (the standby time) is less than the first reference time (small), the first (second) resonance frequency f1 (f2) that is measured in the previous measurement (the one stored in the storing circuit 18) is used as the measurement result. The ultrasonic motor M is started based on this first (second) frequency f1 (f2). Therefore, if the time elapsed from the previous measurement is extremely short, the measurement time is further shortened. Since the actual measurement is not performed, the measurement time is reduced to zero. If the time elapsed from the previous measurement is less than the second reference time (middle), which is longer than the first reference time, the range within which the SHf voltage V2 is changed is set to the narrow range W2a (W2b). If the elapsed time is longer than the second reference time (great), the range is set to the range W3a (W3b), which is narrower than the range W1 and wider than the range W2a (W2b). Therefore, if the time from the previous measurement (the standby time) is longer than the first reference time, the first (second) resonance frequency f1, f2 is measured according to the probability of displacement of the frequency f1, f2 while reducing the measurement range. That is, the first and second resonance frequencies f1, f2 are reliably measured while shortening the measurement time (the average measurement time).

Figure 9A:
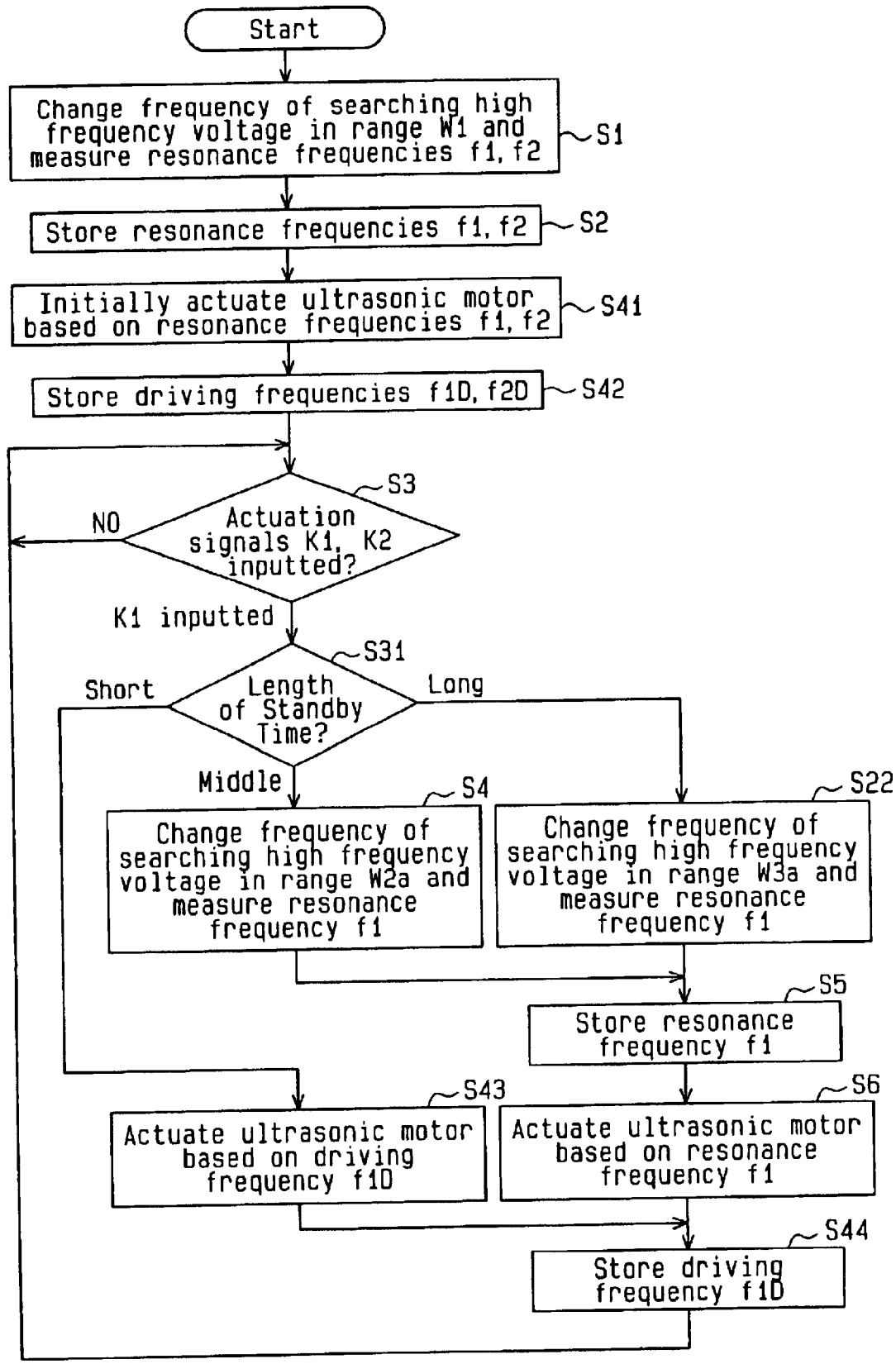
FIG. 9(a) is a flowchart showing a process executed by a controller according to another embodiment.
Figure 9B:
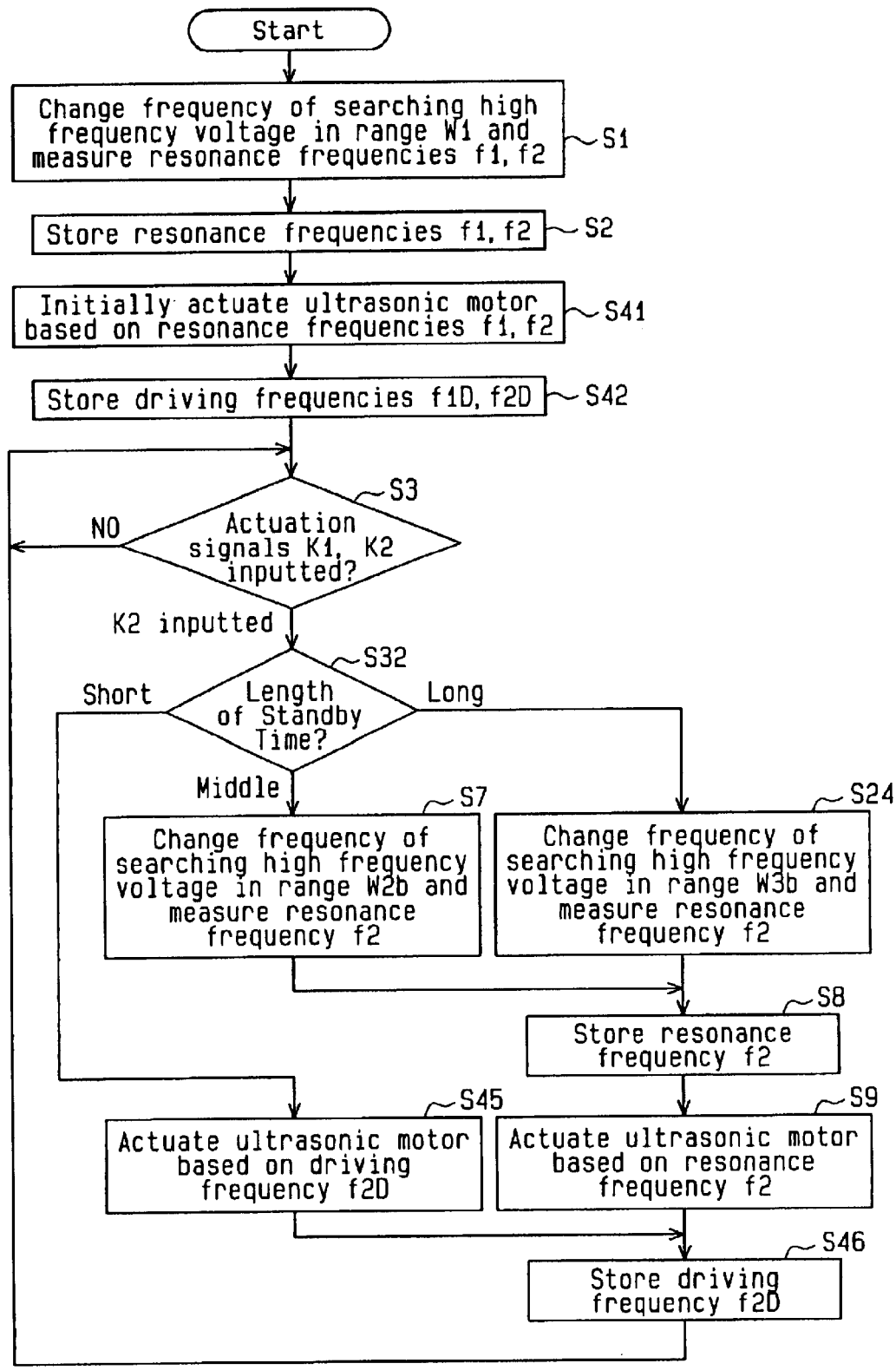
FIG. 9(b) is a flowchart showing the remainder of the process of FIG. 9(a)
Figure 10:
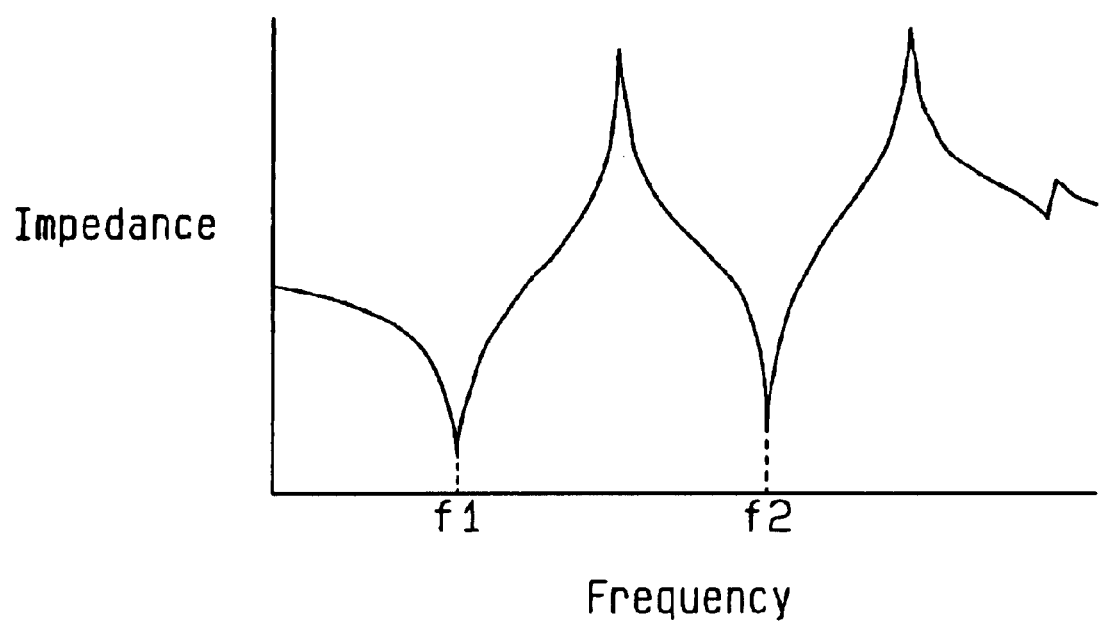
FIG. 10 is a graph showing the relationship between the frequency and the impedance of a prior art ultrasonic motor.

The illustrated embodiment may be modified as shown in FIG. 9. The process of FIG. 9 is similar to the process shown in FIG. 3 and the process shown in FIGS. 7 and 8. Therefore, like or the same reference numerals are given to those steps that are like or the same as the corresponding steps in FIGS. 3, 7 and 8.

After step S2, the microcomputer 12 proceeds to step S41. In step S41, based on the measured first and second resonance frequencies f1, f2, which are stored in the memory circuit 18, the control apparatus 11 sets the driving constant voltage as the Hfd voltage V1 and supplies the Hfd voltage V1 to the ultrasonic motor M, thereby initially driving the motor M. The initial driving refers to driving of the rotor 2 based on a predetermined value. For example, if the ultrasonic motor M is used for a tilt steering wheel or a telescopic device, the initial driving refers to a control for moving the steering wheel to a predetermined position at a predetermined speed (in this case, rotating the rotor 2 at 300 rpm).

In step S41, the pulse circuit 19 outputs a pulse signal that corresponds to the rotation speed (the number of rotation) of the rotor 2. Then, based on the pulse signal, the microcomputer 12 measures a first (and second) driving frequency f1D (f2D), which is the frequency when the rotation speed is a predetermined (arbitrary) rotation speed (in this example −300 (+300) rpm). In this example, the first (and second) driving frequency f1D (f2D) is approximately 57.9 kHz (approximately 60.9 kHz) (see FIG. 4). The microcomputer 12, the high constant voltage circuit 13, the booster circuit 15, the frequency generating circuit 16, the memory circuit 18, and the pulse generating circuit 19 form driving frequency measuring means.

In step S42, the microcomputer 12 stores the measured first and second driving resonance frequencies f1D, f2D in the memory circuit 18, and proceeds to step S3. In this example, the memory circuit 18 has memory areas for storing the first and second resonance frequencies f1, f2, and the first and second driving frequencies f1D, f2D. In step S42, the memory circuit 18 stores the first and second driving frequencies f1D, f2D while retaining the first and second resonance frequencies f1, f2.

If the microcomputer 12 judges that it has received the actuation signal K1 based on manipulation of the switch 21 in step 3, the microcomputer 12 proceeds to stop S31.

In step S31, the microcomputer 12 judges whether the time elapsed from the previous measurement, or the standby time, is shorter (small) than a predetermined first reference time. The microcomputer 12 also judges whether the elapsed time is shorter (middle) than a predetermined second reference time and whether the elapsed time is longer (great) than the second reference time.

When determining that the elapsed time is shorter (small) than the first reference time in step S31, the microcomputer 12 proceeds to step S43.

In step S43, based on the measured first driving resonance frequencies f1D, which is stored in the memory circuit 18, the control apparatus 11 sets the driving constant voltage as the Hfd voltage V1 and supplies the Hfd voltage V1 to the ultrasonic motor M to actuate the motor M, thereby rotating the rotor 2 by a predetermined amount.

In this example, the frequency generating circuit 16 supplies the Hfd voltage V1 that is greater than the first driving frequency f1D (approximately 57.9 kHz) by a predetermined amount (for example by 0.5 kHz), and shifts the frequency to the first driving frequency f1D, thereby driving the ultrasonic motor M.

In step S43, the microcomputer 12 measures the first driving frequency f1D in a manner similar to step S41.

In step S44, the microcomputer 12 stores the measured first driving resonance frequencies f1D in the memory circuit 18, and proceeds to step 53.

When determining that the elapsed time is shorter (middle) than the second reference time, which is longer than the first reference time, in step S31, the microcomputer 12 proceeds to step S4 and then to step S5.

When determining that the elapsed time is longer (great) than the second reference in step S31, the microcomputer 12 proceeds to step 22 and then to step S5.

In step S6, the microcomputer 12 rotates the rotor 2 by a predetermined amount and then finishes driving the ultrasonic motor M. Thereafter, the microcomputer 12 proceeds to step S44.

Like part of step S43, step 36 of this embodiment includes a process for measuring the first driving frequency f1D. In step S44, the microcomputer 12 stores the first driving resonance frequencies f1D, which has been measured in step S6, in the memory circuit 18, and proceeds to step S3.

If the microcomputer 12 judges that it has received the actuation signal K2 based on manipulation of the switch 21 in step S3, the microcomputer 12 proceeds to step S32.

In step S32, the microcomputer 12 judges whether the time elapsed from the previous measurement, or the standby time, is shorter (small) than the first reference time. The microcomputer 12 also judges whether the elapsed time is shorter (middle) than the second reference time and whether the elapsed time is longer (great) than the second reference time.

When determining that the elapsed time is shorter (small) than the first reference time in step S32, the microcomputer 12 proceeds to step S45.

In step S45, based on the measured second driving resonance frequencies f2D, which is stored in the memory circuit 18, the control apparatus 11 sets the driving constant voltage as the Hfd voltage V1 and supplies the Hfd voltage V1 to the ultrasonic motor M to actuate the motor M, thereby rotating the rotor 2 by a predetermined amount In this example, the frequency generating circuit 16 supplies the Hfd voltage V1 that is greater than the second driving frequency f2D (approximately 60.9 kHz) by a predetermined amount (for example, by 0.5 kHz), and shifts the frequency to the second driving frequency f2D, thereby driving the ultrasonic motor M. In step S45, the microcomputer 12 measures the second driving frequency f2D in a manner similar to step S41.

In step S46, the microcomputer 12 stores the measured second driving resonance frequency f2D in the memory circuit 18, and proceeds to step S3.

When determining that the elapsed time is shorter (middle) than the second reference time, which is longer than the first reference time, in step S32, the microcomputer 12 proceeds to step S7 and then to step S8.

When determining that the elapsed time is longer (great) than the second reference time in step S32, the microcomputer 12 proceeds to step S24 and then to step S8.

In step S9, the microcomputer 12 rotates the rotor 2 by a predetermined amount and then finishes driving the ultrasonic motor M. Thereafter, the microcomputer 12 proceeds to step S46.

Like part of step S45, step S9 of this embodiment includes a process for measuring the second driving frequency f2D. In step S46, the microcomputer 12 stores the second driving resonance frequency f2D, which has been measured in step S9, in the memory circuit 18, and proceeds to step S3.

That is, if the time elapsed from the previous measurement (actuation) is less than the first reference time (small), the first (second) driving frequency f1D (f2D) that is measured in the previous measurement (the one stored in the storing circuit 18) is used as the measurement result. The ultrasonic motor M is actuated based on this first (second) driving frequency f1 (f2). Therefore, if the time elapsed from the previous measurement (actuation) is extremely short, the measurement time is further shortened. Since the actual measurement is not performed, the measurement time is reduced to zero.

Further, the driving frequency f1D (f2D) that is measured during the actual actuation is more reliable than the resonance frequency f1 (f2) that is measured by changing the frequency of the SHf voltage V2. In other words, the driving frequency f1D (f2D) is reliable data for actuating the ultrasonic motor M. Thus, the ultrasonic motor M is actuated in a favorable manner.

If the time elapsed from the previous measurement is less than the second reference time (middle), which is longer than the first reference time, the range within which the SHf voltage V2 is changed is set to the narrow range W2a (W2b). If the elapsed time is longer than the second reference time (great), the range is set to the range W3a (W3b), which is narrower than the range W1 and wider than the range W2a (W2b). Therefore, if the time from the previous measurement (the standby time) is longer than the first reference time, the first (second) resonance frequency f1, f2 is measured according to the probability of displacement of the frequency f1, f2 while reducing the measurement range. That is, the first and second resonance frequencies f1, f2 are reliably measured while shortening the measurement time (the average measurement time).

In the above embodiments, when the first (second) resonance frequency f1 (f2) is measured for the second time or later, the range W2a (W2b), within which the SHf voltage V2 is changed, is set as a narrow range based on the first (second) resonance frequency f1 (f2) that is measured in the previous procedure. However, the range W2a (W2b) may be set as a narrow range based on the first (second) resonance frequency f1 (f2) measured for the first time (in step S1). For example, the range W2a (W2b) may be set as a range of 1 kHz including the first (second) resonance frequency f1 (f2) measured for the first time. This configuration also shortens the measurement time.

In the above embodiments, when the first (second) resonance frequency f1 (f2) is measured for the second time or later, the range W2a (W2b), within which the SHf voltage V2 is changed, is set as a narrow range based on the first (second) resonance frequency f1 (f2) that is measured in the previous procedure. However, the range W2a (W2b) may be set as a narrow range based on the average of the first (second) resonance frequencies f1, f2 that are previously measured. For example, the range W2a (W2b) may be set as a range of 1 kHz including the average. This configuration also shortens the measurement time.

In the above embodiments, the first and second resonance frequencies f1, f2 are measured based on the current value in step S1. However, if one of the resonance frequencies can be computed based on the other resonance frequency, that is, if a certain relationship is established between the resonance frequencies, one of the resonance frequencies may be measured and the other resonance frequency may be computed based on the measured resonance frequency.

This configuration narrows the range within which the frequencies are changed, that is, shortens the measurement time.

In the above embodiments, when starting the ultrasonic motor M, the Hfd voltage V1, the frequency of which is higher than the measured first (second) resonance frequency f1 (f2) by a predetermined amount (for example, 1.5 kHz), is supplied to the motor M. Then, the frequency is shifted to the first (second) resonance frequency f1 (f2). However, the Hfd voltage V1 the frequency of which is lower than the measured first (second) resonance frequency f1 (f2) may be supplied to the motor M, and then, the frequency may be shifted to the first (second) resonance frequency f1 (f2). This modification has the same advantages as the above embodiment.

In the above embodiments, when starting the ultrasonic motor M, the Hfd voltage V1, the frequency of which is higher than the measured first (second) resonance frequency f1 (f2) by a predetermined amount (for example, by 1.5 kHz), is supplied to the motor M. Then, the frequency is shifted to the first (second) resonance frequency f1 (f2). However, if the number of rotation of the rotor 2 is set to a certain number, the measured first (second) resonance frequency f1 (f2) may be shifted until the number of rotation matches the certain number. In this case, the number of rotation of the rotor 2 is reliably and gradually changed to the certain number. As a matter of course, the Hfd voltage V1 the frequency of which is less than the measured first (second) resonance frequency f1 (f2) (for example, by 0.3 kHz) may be supplied to the motor M, and the frequency may be shifted toward the first (second) resonance frequency f1 (f2) until the number of rotation matches the certain number.

In the above embodiments, when starting the ultrasonic motor M, the Hfd voltage V1, the frequency of which is higher than the measured first (second) resonance frequency f1 (f2) by a predetermined amount (for example, by 15 kHz), is supplied to the motor M. Then, the frequency is shifted to the first (second) resonance frequency f1 (f2). However, the Hfd voltage V1 of the first (second) resonance frequency f1 (f2) may be supplied to the motor M from the beginning. This modification has the advantages (1) to (5), (7), and (8) of the above embodiment.

In the above embodiments, the ultrasonic motor M is actuated at different rotation characteristics (different rotation direction) at different first and second resonance frequencies f1, f2. However, the motor M may rotate only in one direction. Further, the motor M may be actuated at three or more different rotation characteristics. In this case, since the resonance frequencies and the driving signals are different for each characteristic, each process needs to be changed as necessary. In this case, by controlling the Hfd voltage based on the resonance frequencies measured prior to actuation, the ultrasonic motor M is reliably started.

In the above embodiment, when the first (second) resonance frequency f1 (f2) is measured in each of steps S1, S4, S7, the measurement is terminated based on the detection of the resonance frequency f1 (f2) regardless of the predetermined ranges W1, W2a, W2b. However, the measurement may be terminated after the frequency is changed within the predetermined ranges W1, W2a, W2b. This modification has the advantages (1), (2), and (4) to (8) of the above embodiment. As a matter of course, in steps S22 and S24 (see FIGS. 8 and 9), the measurement may be terminated after the frequency is changed within the predetermined ranges W3a, W3b.

In the above embodiment, when power is turned on, the first and second resonance frequencies f1, f2 are measured for the first time regardless whether the motor M is started.

When the actuation signal K1 (K2) is inputted, the first (second) resonance frequency f1 (f2) at the time of actuation is measured, and the motor M is started based on the measured first (second) resonance frequency f1 (f2). However, the resonance frequency of the motor may be measured at least one time by a Hfd voltage that is set lower than the driving high frequency voltage, and the Hfd voltage may be controlled based on the measured resonance frequency. In this case, the timing of the measurement may be changed as necessary. In this case, the ultrasonic motor is reliably actuated.

In the above embodiment, the frequency generating circuit 16, which changes the SHf voltage V2, also shifts the frequency of the Hfd voltage V1. However, these two operations may be performed by two different circuits. This modification has the advantages (1) to (6), and (8) of the above.

In the illustrated embodiment, the present invention is applied to the control apparatus of the on-vehicle actuator that has the ultrasonic motor M. However, the present invention may be applied to a control apparatus that is not used for vehicles as long as the control apparatus actuates an ultrasonic motor.

Therefore, the present examples and embodiments are to be considered as illustrative and not restrictive and the invention is not to be limited to the details given herein, but may be modified within the scope and equivalence of the appended claims.

What is claimed is:

1. A control apparatus for controlling an ultrasonic motor, wherein the ultrasonic motor includes a stator, a piezoelectric element provided in the stator, and a rotor, the rotor being slidably pressed against the stator, wherein, when a driving high frequency voltage is applied to the piezoelectric element, the stator is vibrated to rotate the rotor, wherein the control apparatus further includes measuring means, and wherein the measuring means changes the frequency of a searching high frequency voltage, the searching high frequency voltage being lower than the driving high frequency voltage, thereby measuring a resonance frequency of the ultrasonic motor.

2. The control apparatus according to claim 1, wherein the resonance frequency is one of at least two resonance frequencies, and wherein the ultrasonic motor is actuated at a different rotation characteristic for each resonance frequency.

3. The control apparatus according to claim 1, wherein the measuring means includes:
   a searching constant voltage generating circuit for generating a searching constant voltage, wherein the voltage value of the searching constant voltage corresponds to the searching high frequency voltage;
   a frequency generating circuit, which converts the searching constant voltage into the searching high frequency voltage and changes the frequency of the searching high frequency voltage;
   a detection circuit for detecting a variable value, wherein the variable value changes when the frequency of the searching high frequency voltage is changed and represents the actuation state of the motor; and
   a memory circuit for storing the resonance frequency obtained based on the variable value.

4. The control apparatus according to claim 1, wherein, to measure the resonance frequency, the measuring means first changes the frequency of the searching high frequency voltage within a first range that includes the resonance frequency, and, in the second and subsequent measurements, the measuring means changes the frequency of the searching high frequency voltage within a second range, the second range being narrower than the first range.

5. The control apparatus according to claim 4, wherein, in each of the second and subsequent measurements, the measuring means changes the frequency of the searching high frequency voltage in the second range in accordance with the time that has elapsed since the last measurement.

6. The control apparatus according to claim 4, wherein the measuring means discontinues the measurement when the resonance frequency to be measured is detected.

7. The control apparatus according to claim 2, wherein the measuring means measures one of the resonance frequencies, and wherein the measuring means computes the remainder of the resonance frequencies based on the measured resonance frequency.

8. The control apparatus according to claim 3, wherein the variable value is at least one of a current value or an electric power value supplied to the piezoelectric element, a phase difference between a voltage supplied to the piezoelectric element and a current supplied to the piezoelectric element, a resistance value of the piezoelectric element, and a voltage value generated by the piezoelectric element when the piezoelectric element moves.

9. The control apparatus according to claim 1, wherein, when starting the ultrasonic motor, the control apparatus first supplies a driving high frequency voltage to the piezoelectric element, the driving high frequency voltage having a first frequency that is greater than the measured resonance frequency by a predetermined amount, and the control apparatus then changes the frequency of the driving high frequency voltage from the first frequency toward the resonance frequency.

10. The control apparatus according to claim 9, wherein, as the frequency of the driving high frequency voltage is changed from the first frequency toward the resonance frequency, the number of revolution of the rotor is increased, and wherein, until the driving high frequency voltage becomes a value that is equal to or higher than the resonance frequency and corresponds to a predetermined number of revolution, the control apparatus continues changing the frequency of the driving high frequency voltage toward the resonance frequency.

11. The control apparatus according to claim 9, wherein the measuring means includes a frequency generating circuit for changing the frequency of the searching high frequency voltage, and wherein the frequency generating circuit also changes the driving high frequency voltage.

12. The control apparatus according to claim 1, wherein the control apparatus first supplies a driving high frequency voltage to the piezoelectric element, the driving high frequency voltage having a second frequency that is smaller than the measured resonance frequency by a predetermined amount, and the control apparatus then changes the frequency of the driving high frequency voltage from the second frequency toward the resonance frequency.

13. The control apparatus according to claim 12, wherein the measured resonance frequency is an actuation frequency at the time when the number of revolution of the rotor becomes a predetermined number of revolution.

14. The control apparatus according to claim 12, wherein the measuring means includes a frequency generating circuit for changing the frequency of the searching high frequency voltage, and wherein the frequency generating circuit also changes the driving high frequency voltage.

15. A method for controlling an ultrasonic motor, wherein the ultrasonic motor includes a stator, a piezoelectric element provided in the stator, and a rotor, the rotor being slidably pressed against the stator, the method comprising:

a first step, in which, to measure a resonance frequency of the ultrasonic motor, the frequency of a searching high frequency voltage is changed, the searching high frequency voltage being lower than the driving high frequency voltage of the ultrasonic motor; and a second step, in which the stator is vibrated to rotate the rotor when the driving high frequency voltage is applied to the piezoelectric element.

16. The control method according to claim 15, wherein the resonance frequency is one of at least two resonance frequencies, and wherein the ultrasonic motor is actuated at a different rotation characteristic for each resonance frequency.

17. The control apparatus according to claim 15, wherein the first step includes:

first changing the frequency of the searching high frequency voltage within a first range that includes the resonance frequency; and changing the frequency of the searching high frequency voltage within a second range, the second range being narrower than the first range, in the second and subsequent measurements.

18. The control method according to claim 17, wherein, in each of the second and subsequent measurements of the first step, the frequency of the searching high frequency voltage is changed within the second range in accordance with the time that has elapsed since the last measurement.

19. The control method according to claim 17, wherein, in the first step, the measurement is discontinued when the resonance frequency is detected.

20. The control method according to claim 16, wherein, in the first step, one of the resonance frequencies is measured, and the remainder of the resonance frequencies is computed based on the measured resonance frequency.

21. The control method according to claim 15, further comprising:

a step for detecting a variable value, wherein the variable value changes when the frequency of the searching high frequency voltage is changed and represents the actuation state of the motor; and a step for storing the resonance frequency obtained based on the variable value, wherein the variable value is at least one of a current value or an electric power value supplied to the piezoelectric element, a phase difference between a voltage supplied to the piezoelectric element and a current supplied to the piezoelectric element, a resistance value of the piezoelectric element, and a voltage value generated by the piezoelectric element when the piezoelectric element moves.

22. The control method according to claim 15, wherein, when the ultrasonic motor is started, a driving high frequency voltage is first supplied to the piezoelectric element, the driving high frequency voltage having a first frequency that is greater than the measured resonance frequency by a predetermined amount, and then the frequency of the driving high frequency voltage is changed from the first frequency toward the resonance frequency.

23. The control method according to claim 22, wherein, as the frequency of the driving high frequency voltage is changed from the first frequency toward the resonance frequency, the number of revolution of the rotor is increased, and wherein, until the driving high frequency voltage becomes a value that is equal to or higher than the resonance frequency and corresponds to a predetermined number of revolution, the frequency of the driving high frequency voltage continues being changed toward the resonance frequency.

24. The control method according to claim 15, wherein, when the ultrasonic motor is started, a driving high frequency voltage is first supplied to the piezoelectric element, the driving high frequency voltage having a second frequency that is smaller than the measured resonance frequency by a predetermined amount, and then the frequency of the driving high frequency voltage is changed from the second frequency toward the resonance frequency.

25. The control method according to claim 24, wherein the measured resonance frequency is an actuation frequency at the time when the number of revolution of the rotor becomes a predetermined number of revolution.

* * * * *